(12) United States Patent
Ding et al.

(10) Patent No.: US 10,296,124 B2
(45) Date of Patent: May 21, 2019

(54) TOUCH SCREEN AND DRIVING METHOD THEREOF, AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Xiaochuan Chen, Beijing (CN); Yingming Liu, Beijing (CN); Wei Liu, Beijing (CN); Pengpeng Wang, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 30 days.

(21) Appl. No.: 15/501,667

(22) PCT Filed: Aug. 15, 2016

(86) PCT No.: PCT/CN2016/095303
§ 371 (c)(1),
(2) Date: Feb. 3, 2017

(87) PCT Pub. No.: WO2017/067304
PCT Pub. Date: Apr. 27, 2017

(65) Prior Publication Data
US 2017/0277329 A1 Sep. 28, 2017

(30) Foreign Application Priority Data

Oct. 22, 2015 (CN) .......................... 2015 1 0691224

(51) Int. Cl.
*G06F 3/044* (2006.01)
*G06F 3/041* (2006.01)

(52) U.S. Cl.
CPC ............ *G06F 3/0414* (2013.01); *G06F 3/044* (2013.01); *G06F 3/0412* (2013.01);
(Continued)

(58) Field of Classification Search
CPC ...... G06F 3/0414; G06F 3/0412; G06F 3/044; G06F 2203/04112; G06F 2300/0426
See application file for complete search history.

(56) References Cited

U.S. PATENT DOCUMENTS

| 2010/0182275 | A1 | 7/2010 | Saitou | |
| 2013/0265256 | A1* | 10/2013 | Nathan | ................. G06F 3/0414 345/173 |
| 2017/0068348 | A1* | 3/2017 | Kemppinen | ............ G06F 3/044 |

FOREIGN PATENT DOCUMENTS

| CN | 104020913 A | 9/2014 |
| CN | 104216584 A | 12/2014 |

(Continued)

OTHER PUBLICATIONS

International search report dated Nov. 14, 2016 for international application No. PCT/CN2016/095303.
(Continued)

*Primary Examiner* — Mark Edwards
(74) *Attorney, Agent, or Firm* — Nath, Goldberg & Meyer; Joshua B. Goldberg; Daniel Bissing (57) ABSTRACT

The present invention provides a touch screen, a driving method thereof, and a display apparatus. The touch screen includes a liquid crystal cell formed by assembling an array substrate and a color filter substrate and a fixed electrode provided at a side of the array substrate distal to the color filter substrate, and further includes a common electrode
(Continued)

provided on the array substrate and a shielding electrode provided at a side of the common electrode distal to the fixed electrode, the common electrode serves as a first drive electrode in force touch, a position of the fixed electrode corresponds to that of the common electrode, and the fixed electrode is configured to assist the first drive electrode to detect a touch force in force touch.

18 Claims, 4 Drawing Sheets

(52) U.S. Cl.
CPC .. *G06F 3/0416* (2013.01); *G06F 2203/04107* (2013.01); *G06F 2203/04112* (2013.01); *G09G 2300/0426* (2013.01)

(56) References Cited

FOREIGN PATENT DOCUMENTS

| CN | 104615322 A | * | 5/2015 |
| CN | 104793828 A | | 7/2015 |
| CN | 104820308 A | * | 8/2015 |
| CN | 205038622 U | | 2/2016 |

OTHER PUBLICATIONS

Written opinion of the international searching authority dated Nov. 14, 2016 for international application No. PCT/CN2016/095303 with English translation.

* cited by examiner

TOUCH SCREEN AND DRIVING METHOD THEREOF, AND DISPLAY APPARATUS

This is a National Phase Application filed under 35 U.S.C. 371 as a national stage of PCT/CN2016/095303, filed Aug. 15, 2016, an application claiming the benefit of Chinese Application No. 201510691224.6, filed Oct. 22, 2015, the content of each of which is hereby incorporated by reference in its entirety.

TECHNICAL FIELD

The present invention relates to the field of display technology, and particularly relates to a touch screen and a driving method thereof, and a display apparatus.

BACKGROUND

Pressure sensing technology refers to a technology capable of detecting externally applied forces, and has long been applied in fields such as industrial control, medical treatment, and the like. Currently, many manufactures are seeking for an appropriate solution for achieving pressure-sensitive touch control in the field of displays, particularly in the field of mobile phones or flat panel displays, because displays having a force touch function can provide clients with better human-computer interaction experience.

At present, however, for most of displays having a force touch function, the force touch function is achieved by additionally providing a force touch mechanism in a backlight part of a display (e.g., a liquid crystal display) or in a middle frame of a display (e.g., a mobile phone). Such a design needs to change the structure of a display itself, and the accuracy of force detection of the three touch mechanism may be greatly limited due to a large assembly tolerance in equipping the display with the force touch mechanism; in addition, such a design causes the display to achieve pressure-sensitive touch control at a relatively high cost, which is not conducive to rapid and widespread promotion of pressure-sensitive touch control in the field of displays.

SUMMARY

In view of the above technical problems existing in the prior art, the present invention provides a touch screen and a driving method thereof, and a display apparatus including the touch screen. The touch screen achieves pressure-sensitive touch control based on self-capacitance principle, which not only lowers production difficulty of the pressure-sensitive touch screen and improves touch control accuracy of the pressure-sensitive touch screen, but also reduces production and assembly costs of the pressure-sensitive touch screen, thereby promoting the pressure-sensitive touch screen more rapidly and widely.

The present invention provides a touch screen including a liquid crystal cell formed by assembling an array substrate and a color filter substrate, and a fixed electrode provided at a side of the array substrate distal to the color filter substrate, wherein, the touch screen further includes a common electrode provided on the array substrate and a shielding electrode provided at a side of the common electrode distal to the fixed electrode, the common electrode serves as a first drive electrode in force touch, a position of the fixed electrode corresponds to that of the common electrode, and the fixed electrode is configured to assist the first drive electrode to detect a touch force in force touch.

Preferably, the common electrode includes a plurality of strip-like first sub-electrodes having a same shape, each of the plurality of first sub-electrodes extends in a first direction, and the plurality of first sub-electrodes are parallel to each other and arranged sequentially in a second direction perpendicular to the first direction.

Preferably, the common electrode includes a plurality of strip-like first sub-electrodes having a same shape, the plurality of first sub-electrodes are arranged in a matrix, and a length direction of the first sub-electrode is parallel to a row direction of the matrix.

Preferably, each of the plurality of first sub-electrodes is connected to one drive signal line.

Preferably, the fixed electrode is grounded or connected to a fixed voltage.

Preferably, the shielding electrode has the same size and shape as the common electrode, the shielding electrode is aligned with the common electrode, and an orthographic projection of the shielding electrode on the array substrate and/or the color filter substrate overlaps with that of the common electrode.

Preferably, the shielding electrode is provided on the color filter substrate.

Preferably, the shielding electrode is provided above the common electrode on the array substrate, and an insulation layer is sandwiched between the shielding electrode and the common electrode.

Preferably, the touch screen further includes a sensing electrode provided on the color filter substrate, and the common electrode also serves as a second drive electrode in mutual capacitive touch control.

Preferably, the sensing electrode and the shielding electrode are located on two opposite sides of the color filter substrate, respectively.

Preferably, the sensing electrode includes a plurality of strip-like second sub-electrodes having a same shape, each of the plurality of second sub-electrodes extends in the second direction, and the plurality of second sub-electrodes are parallel to each other and arranged sequentially in the first direction perpendicular to the second direction.

Preferably, a middle frame isolating interior of the touch screen from outside and functioning as a shield is used as the fixed electrode.

Preferably, the shielding electrode is configured to eliminate capacitance formed between the first drive electrode and a touch object performing force touch on the touch screen.

The present invention further provides a display apparatus, including the above touch screen.

The present invention further provides a driving method of the above touch screen, including a display phase and a force touch phase in a time-division manner, wherein, in the display phase, the common electrode is supplied with a common voltage signal, and the shielding electrode is supplied with the common voltage signal or is floating; and in the force touch phase, the common electrode serves as the first drive electrode, which is supplied with a force touch drive signal, the shielding electrode is supplied with a fixed voltage signal or the force touch drive signal, and the fixed electrode assists the first drive electrode to detect a touch force.

Preferably, in the force touch phase, the entire first drive electrode is driven simultaneously.

Preferably, the force touch phase is inserted after display of any row of pixels and before display of a next row of pixels during the display of one frame of image; or, the force touch phase is inserted after display of a previous frame of image and before display of a next frame of image.

Preferably, the driving method further includes a mutual capacitive touch control phase, wherein, the display phase, the force touch phase and the mutual capacitive touch control phase appear in a time-division manner;

in the mutual capacitive touch control phase, the common electrode serves as a second drive electrode, which is supplied with a mutual capacitive touch drive signal, and the shielding electrode is floating.

Preferably, in the mutual capacitive touch control phase, the second drive electrode is driven row by row.

Preferably, the mutual capacitive touch control phase is inserted after display of any row of pixels and before display of a next row of pixels during the display of one frame of image; or, the mutual capacitive touch control phase is inserted after display of a previous frame of image and before display of a next frame of image.

The present invention has the beneficial effects as follows. In the touch screen provided by the present invention, by providing the shielding electrode at the side of the common electrode distal to the fixed electrode, using the common electrode as the first drive electrode in force touch, and using the fixed electrode originally provided in the touch screen to assist force touch, force touch based on self-capacitance principle is achieved, which not only lowers production difficulty of the pressure-sensitive touch screen and improves touch control accuracy of the pressure-sensitive touch screen, but also reduces production and assembly costs of the pressure-sensitive touch screen, thereby promoting the pressure-sensitive touch screen more rapidly and widely.

In the display apparatus provided by the present invention, by using the above touch screen, the display apparatus can achieve pressure-sensitive touch control based on self-capacitance principle, and reduce production and assembly costs of the display apparatus.

DETAILED DESCRIPTION

To make those skilled in the art better understand technical solutions of the present invention, a touch screen and a driving method thereof, and a display apparatus including the touch screen provided in the present invention will be further described in detail below in conjunction with the accompanying drawings and the specific implementations.

Figure 1:
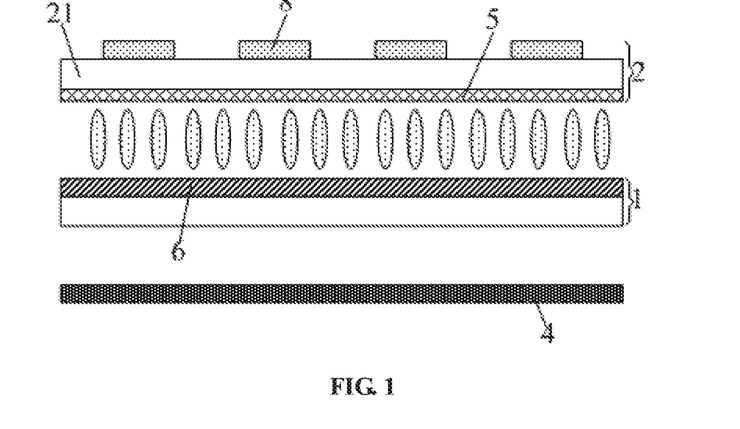
FIG. 1 is a cross-sectional view of a structure of a touch screen according to an embodiment of the present invention.

Embodiments of the present invention provide a touch screen, which, as shown in FIG. 1, includes a liquid crystal cell 3 formed by assembling an array substrate 1 and a color filter substrate 2, and a fixed electrode 4 provided at a side of the array substrate 1 distal to the color filter substrate 2. Furthermore, the touch screen also includes a shielding electrode 5 and a common electrode 6, the common electrode 6 is provided on a side of the array substrate 1 close to the color filter substrate 2, the shielding electrode 5 is provided at a side of the common electrode 6 distal to the fixed electrode 4, the common electrode 6 serves as a first drive electrode in force touch, and the fixed electrode 4 is provided at a position corresponding to the position of the common electrode 6 and used for assisting the common electrode 6 serving as the first drive electrode to detect a touch force in force touch.

A touch screen is generally provided with a middle frame which is used for isolating the interior of the touch screen from outside and functions as a shield. In the present embodiment, the middle frame of the touch screen is used as the fixed electrode 4. In force touch, self-capacitance is formed between the first drive electrode and the fixed electrode 4 and will change as the force applied to the touch screen changes. Specifically, in force touch, the larger force applied to the touch screen, the larger change in the self-capacitance formed between the first drive electrode and the fixed electrode 4; the smaller force applied to the touch screen, the smaller change in the self-capacitance formed between the first drive electrode and the fixed electrode 4. Thus, force touch on the touch screen can be achieved. During a process of applying a touch force to the touch screen, the shielding electrode 5 is configured to eliminate a capacitance formed between a touch object, which applies the touch force to the touch screen, and the first drive electrode, so as to prevent the capacitance formed between the touch object and the first drive electrode from disturbing the self-capacitance formed between the first drive electrode and the fixed electrode 4 in force touch. In this way, the touch screen can not only achieve force touch based on self-capacitance touch control principle, but also have greatly improved force detection accuracy in force touch.

In the touch screen according to the embodiments of the present invention, the shielding electrode 5 is provided at the side of the common electrode 6 distal to the fixed electrode 4, the common electrode 6 serves as the first drive electrode in force touch, and at the same point, the fixed electrode 4 inherently provided in the touch screen is used to assist force touch, thereby achieving force touch based on self-capacitance principle. As a result, not only production difficulty of a pressure-sensitive touch screen is lowered and touch control accuracy of the pressure-sensitive touch screen is improved, but also production and assembly costs of the pressure-sensitive touch screen are reduced, thereby facilitating rapid and widespread promotion of the pressure-sensitive touch screen.

Figure 2:
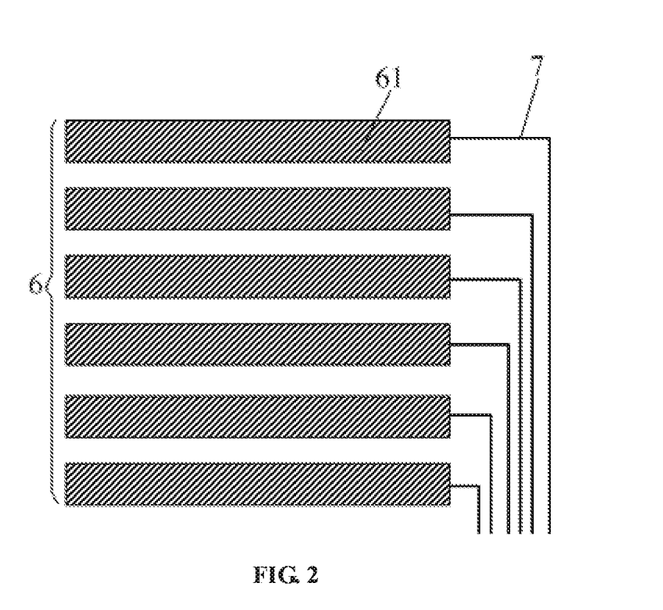
FIG. 2 is a top view of a configuration of a common electrode and wiring thereof in the touch screen shown in FIG. 1.

According to the embodiments of the present invention, as shown in FIG. 2, the common electrode 6 may include a plurality of strip-like first sub-electrodes 61 having a same shape, each of the plurality of first sub-electrodes 61 extends in a first direction (i.e., length direction), and the plurality of first sub-electrodes 61 are parallel to each other and arranged sequentially in a second direction perpendicular to the first direction. Each first sub-electrode 61 is connected to one drive signal line 7. With such arrangement detection of touch force applied to the touch screen based on the self-capacitance principle can be achieved.

According to the embodiments of the present invention, the touch screen may include a backlight source (not shown in the figure), which is provided at a side of the array substrate 1 distal to the color filter substrate 2. The fixed electrode 4 is at a side of the backlight source distal to the array substrate 1; the fixed electrode 4 corresponds to the common electrode 6 and is grounded. Needless to say, the fixed electrode 4 may also be connected to a fixed voltage. The fixed electrode 4 is provided at the side of the backlight source distal to the array substrate 1, so that the fixed electrode 4 will not affect normal display of the touch screen, but ensures isolation and shielding between the interior and the exterior of the touch screen to prevent discharge from the interior of the touch screen to the outside and ensures that an external object will not influence or damage the interior of the touch screen.

Figure 3:
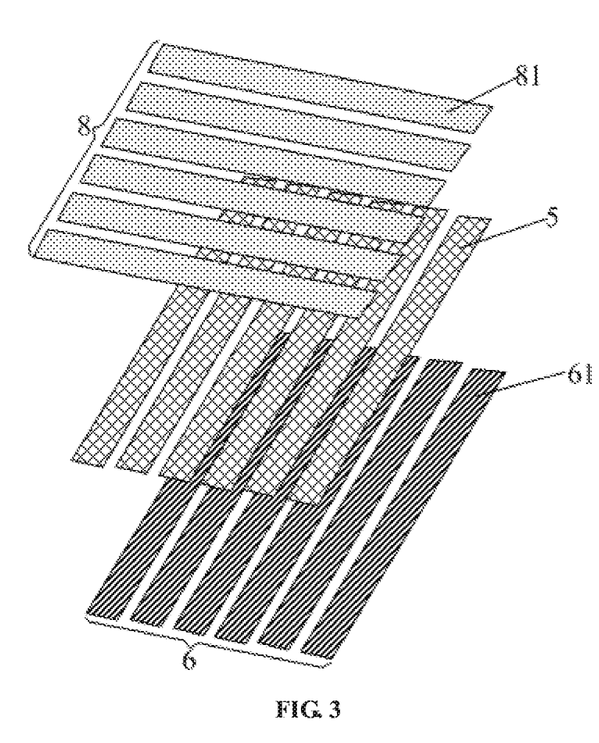
FIG. 3 is a schematic diagram of an arrangement of a common electrode, a shielding electrode and a sensing electrode in the touch screen shown in FIG. 1.
Figure 4:
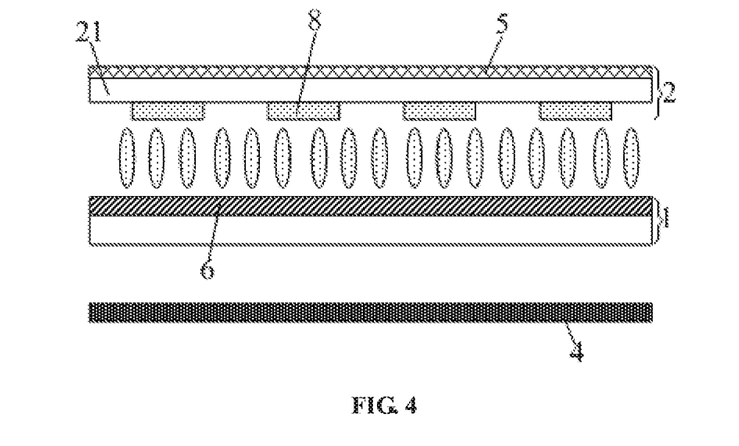
FIG. 4 is a cross-sectional view of a structure of a touch screen according to another embodiment of the present invention.

According to the embodiments of the present invention, the shielding electrode 5 may be provided on the color filter substrate 2, as shown in FIGS. 1 and 4. As shown in FIG. 3, the shielding electrode 5 may have the same size and shape as the common electrode 6, and is aligned with the common electrode 6, and an orthographic projection of the shielding electrode 5 on the array substrate 1 and/or the color filter substrate 2 overlaps with that of the common electrode 6. Such arrangement allows the shielding electrode 5 to better eliminate the capacitance generated between the touch object and the common electrode 6 serving as the first drive electrode in force touch, thus avoids the capacitance generated between the touch object and the first drive electrode from causing interference to the self-capacitance generated between the first drive electrode and the fixed electrode 4 in force touch, and further improves force detection accuracy of the touch screen in force touch.

According to the embodiments of the present invention, as shown in FIGS. 1 and 3, the touch screen may also include a sensing electrode 8 provided on the color filter substrate 2, and the common electrode 6 may also serve as a second drive electrode in mutual capacitive touch control. The shielding electrode 5 and the sensing electrode 8 may be provided on two opposite sides of the color filter substrate 2, respectively. Specifically, the sensing electrode 8 may be provided at the side of the shielding electrode 5 distal to the common electrode 6, as shown in FIG. 1, and alternatively, the sensing electrode 8 may be provided at the side of the shielding electrode 5 close to the common electrode 6, as shown in FIG. 4. In the exemplary embodiment shown in FIG. 1, the color filter substrate 2 includes a base 21, the shielding electrode 5 is provided on a side of the base 21 close to the array substrate 1, and the sensing electrode 8 is provided on a side of the base 21 distal to the array substrate 1. In this case, the touch screen has both a force touch function and a mutual capacitive touch control function. Furthermore, the above-described arrangement can achieve force touch of a hybrid incell touch screen, and thus not only saves production costs and process costs of the touch screen but also improves the force touch accuracy of the touch screen.

According to the embodiments of the present invention, as shown in FIG. 3, the sensing electrode 8 may include a plurality of strip-like second sub-electrodes 81 having a same shape, each of the plurality of second sub-electrodes 81 extends in the second direction, and the plurality of second sub-electrodes 81 are parallel to each other and arranged sequentially in the first direction perpendicular to the second direction. That is, the extending direction and the arrangement direction of the second sub-electrodes 81 are perpendicular to those of the first sub-electrodes 61, respectively. The shielding electrode 5 having the same shape and size as the common electrode 6 can also prevent crosstalk to the sensing electrode 8 in mutual capacitive touch control and is thus prevented from affecting the mutual capacitance between the sensing electrode 8 and the common electrode 6 serving as the second drive electrode in mutual capacitive touch control, and further enables the force touch and mutual capacitive touch control to be performed normally.

Figure 5:
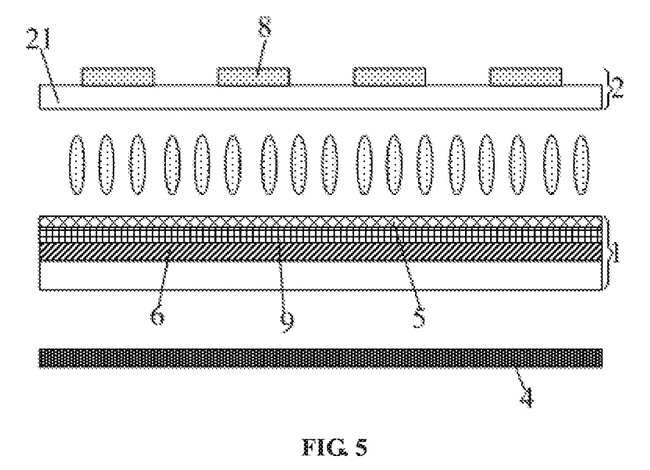
FIG. 5 is a cross-sectional view of a structure of a touch screen according to still another embodiment of the present invention.

According to the embodiments of the present invention, the shielding electrode 5 may be provided on the array substrate 1. As shown in FIG. 5, the shielding electrode 5 is provided above the common electrode 6, and an insulation layer 9 is sandwiched between the shielding electrode 5 and the common electrode 6.

Figure 7:
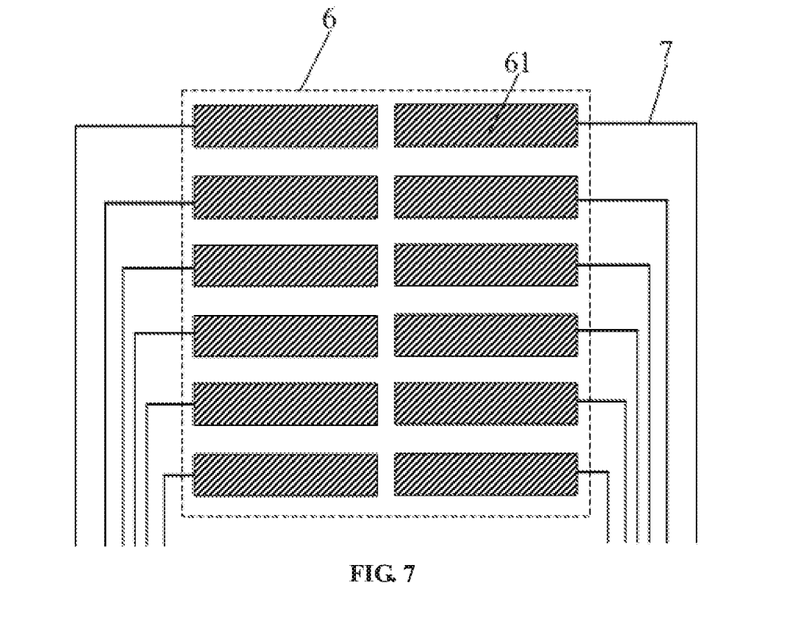
FIG. 7 is a top view of a configuration of a common electrode and wiring thereof in a touch screen according to embodiments of the present invention.

In a touch screen according to another embodiment of the present invention, as shown in FIG. 7, the common electrode 6 may include a plurality of strip-like first sub-electrodes 61 having the same shape, the plurality of first sub-electrodes 61 are arrange in a matrix, and the length direction of the first sub-electrodes 61 is parallel to the row direction of the matrix. Each first sub-electrode 61 is connected to one drive signal line 7. In the touch screen with such arrangement, the common electrode 6 is further divided, that is, each first sub-electrode 61 in the above embodiments is divided into multiple parts, which can further increase the number of the first drive electrodes for achieving force touch in the touch screen, thus allows the touch screen to detect a touch point more sensitively, and further enables the touch screen to achieve multi-point force touch.

Figure 6:
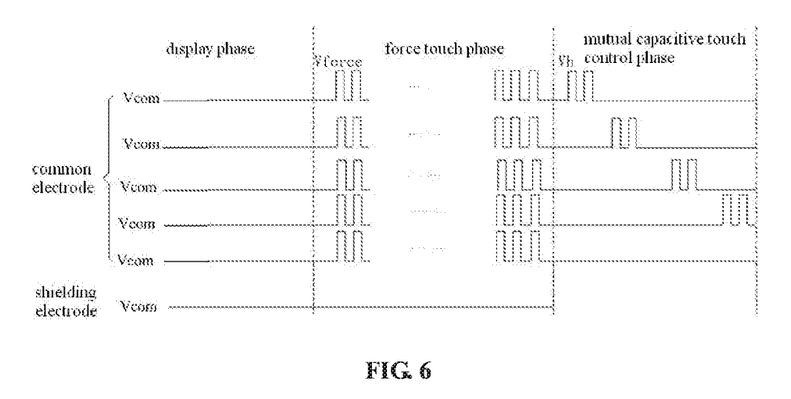
FIG. 6 is a drive timing diagram of a common electrode and a shielding electrode in a touch screen according to embodiments of the present invention.

Based on the above structure of the touch screen, embodiments of the present invention further provide a driving method of the touch screen, and as shown in FIG. 6, the driving method includes a display phase and a force touch phase in a time-division manner. In the display phase, the common electrode is supplied with a common voltage signal Vcom, and the shielding electrode is supplied with the common voltage signal Vcom. In addition, in the display phase, the shielding electrode may be floating. In the force touch phase, the common electrode serve as the first drive electrode, which is supplied with a force touch drive signal Vforce, and the shielding electrode is supplied with a fixed voltage signal such as Vcom. In the force touch phase, the shielding electrode may be supplied with the force touch drive signal Vforce, and the fixed electrode assists the first drive electrode to detect a touch force and is grounded in both the display phase and the force touch phase. Needless to say, the fixed electrode may be connected to a fixed voltage in both the display phase and the force touch phase.

According to the embodiments of the present invention, in the force touch phase, the first drive electrodes are driven simultaneously. The force touch phase may be inserted after display of any row of pixels and before display of a next row of pixels during the display of one frame of image. Alternatively, the force touch phase may be inserted after display of a previous frame of image and before display of a next frame of image.

The driving method according to the embodiments of the present invention may further include a mutual capacitive touch control phase, and the display phase, the force touch phase and the mutual capacitive touch control phase appear in a time-division manner. In the mutual capacitive touch control phase, the common electrode serves as the second drive electrode, which is supplied with a mutual capacitive touch drive signal Vh, and the shielding electrode is floating.

According to the embodiments of the present invention, in the mutual capacitive touch control phase, the second drive electrodes are driven row by row. In this way, mutual capacitive touch control of the touch screen can be better achieved.

According to the embodiments of the present invention, the mutual capacitive touch control phase may be inserted after display of any row of pixels finishes and before display of a next row of pixels starts during the display of one frame of image. Alternatively, the mutual capacitive touch control phase may be inserted after display of a previous frame of image finishes and before display of a next frame of image starts.

Figure 8:
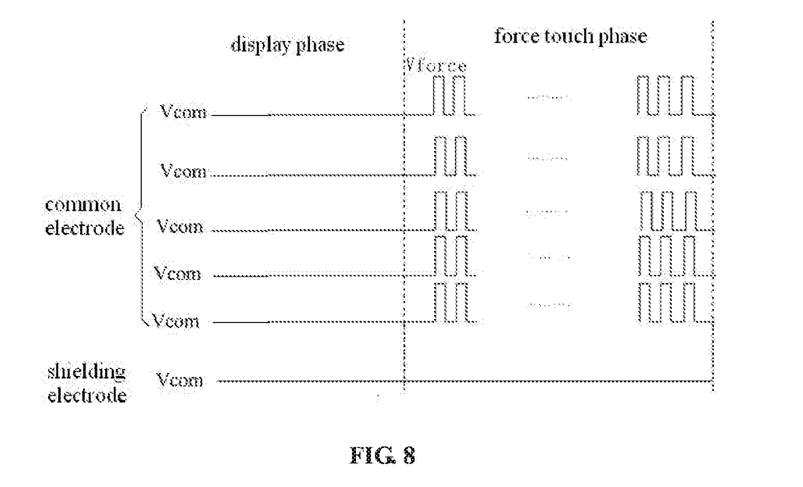
FIG. 8 is a drive timing diagram of a common electrode and a shielding electrode in a touch screen according to embodiments of the present invention.

It should be noted that, the common electrode in the touch screen according to the embodiments of the present invention may not serve as the second drive electrode in mutual capacitive touch control. In this case, the touch screen has the force touch function only, and does not have the mutual capacitive touch control function. Accordingly, as shown in FIG. 8, the driving method for the touch screen includes the display phase and the force touch phase only, and does not include the mutual capacitive touch control phase.

In the touch screen according to the embodiments of the present invention, by providing the shielding electrode at the side of the common electrode distal to the fixed electrode, using the common electrode as the first drive electrode in force touch, and using the fixed electrode originally provided in the touch screen to assist force touch, force touch based on self-capacitance principle is achieved, which not only lowers production difficulty of the pressure-sensitive touch screen and improves touch control accuracy of the pressure-sensitive touch screen, but also reduces production and assembly costs of the pressure-sensitive touch screen, thereby facilitating rapid and wide promotion of the pressure-sensitive touch screen.

Embodiments of the present invention further provide a display apparatus including the touch screen according to any one of the above embodiments of the present invention.

By adopting the touch screen according to any one of the above embodiments, the display apparatus can achieve force touch based on self-capacitance principle, and reduce production and assembly costs of the display apparatus.

The display apparatus may be any product or component with a display function, such as a mobile phone, a tablet computer, a television, a monitor, a notebook computer, a digital photo frame, a navigator or the like.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A touch screen, comprising a liquid crystal cell formed by assembling an array substrate and a color filter substrate, and a fixed electrode provided at a side of the array substrate distal to the color filter substrate, wherein, the touch screen further comprises a common electrode provided on the array substrate and a shielding electrode provided at a side of the common electrode distal to the fixed electrode, the common electrode serves as a first drive electrode in a force touch phase, a position of the fixed electrode corresponds to that of the common electrode, the fixed electrode is configured to assist the first drive electrode to detect a touch force in the force touch phase;

the shielding electrode is configured to eliminate capacitance formed between the common electrode serving as the first drive electrode and a touch object performing force touch on the touch screen; and the shielding electrode has the same size and shape as the common electrode, the shielding electrode is aligned with the common electrode, and an orthographic projection of the shielding electrode on the array substrate and/or the color filter substrate overlaps with that of the common electrode.

2. The touch screen according to claim 1, wherein, the common electrode comprises a plurality of strip-like first sub-electrodes having a same shape, each of the plurality of first sub-electrodes extends in a first direction, and the plurality of first sub-electrodes are parallel to each other and arranged sequentially in a second direction perpendicular to the first direction.

3. The touch screen according to claim 1, wherein, the common electrode comprises a plurality of strip-like first sub-electrodes having a same shape, the plurality of first sub-electrodes are arranged in a matrix, and a length direction of the first sub-electrode is parallel to a row direction of the matrix.

4. The touch screen according to claim 2, wherein, each of the plurality of first sub-electrodes is connected to one drive signal line.

5. The touch screen according to claim 1, wherein, the fixed electrode is grounded or connected to a fixed voltage.

6. The touch screen according to claim 1, wherein, the shielding electrode is provided on the color filter substrate.

7. The touch screen according to claim 1, wherein, the shielding electrode is provided above the common electrode on the array substrate, and an insulation layer is sandwiched between the shielding electrode and the common electrode.

8. The touch screen according to claim 2, further comprising a sensing electrode provided on the color filter substrate, wherein the common electrode also serves as a second drive electrode in mutual capacitive touch control.

9. The touch screen according to claim 8, wherein, the sensing electrode and the shielding electrode are located on two opposite sides of the color filter substrate, respectively.

10. The touch screen according to claim 8, wherein, the sensing electrode comprises a plurality of strip-like second sub-electrodes having a same shape, each of the plurality of second sub-electrodes extends in the second direction, and the plurality of second sub-electrodes are parallel to each other and arranged sequentially in the first direction perpendicular to the second direction.

11. The touch screen according to claim 1, wherein, a middle frame isolating interior of the touch screen from outside and functioning as a shield is used as the fixed electrode.

12. A display apparatus, comprising the touch screen according to claim 1.

13. A driving method of the touch screen according to claim 1, wherein the display phase and the force touch phase are related in a time-division manner, wherein, in the display phase, the common electrode is supplied with the common voltage signal; and in the force touch phase, the common electrode serves as the first drive electrode and is supplied with the force touch drive signal, and the fixed electrode assists the first drive electrode to detect a touch force.

14. The driving method according to claim 13, wherein, in the force touch phase, the entire first drive electrode is driven simultaneously.

15. The driving method according to claim 13, wherein, the force touch phase is inserted after display of any row of pixels and before display of a next row of pixels during the display of one frame of image; or, the force touch phase is inserted after display of a previous frame of image and before display of a next frame of image.

16. The driving method according to claim 13, further comprising a mutual capacitive touch control phase, wherein, the display phase, the force touch phase and the mutual capacitive touch control phase appear in a time-division manner;

in the mutual capacitive touch control phase, the common electrode serves as a second drive electrode and is supplied with a mutual capacitive touch drive signal, and the shielding electrode is floating.

17. The driving method according to claim 16, wherein, in the mutual capacitive touch control phase, the second drive electrode is driven row by row.

18. The driving method according to claim 16, wherein, the mutual capacitive touch control phase is inserted after display of any row of pixels and before display of a next row of pixels during the display of one frame of image; or, the mutual capacitive touch control phase is inserted after display of a previous frame of image and before display of a next frame of image.

* * * * *